Patented May 16, 1944

2,348,772

UNITED STATES PATENT OFFICE 2,348,772

METHOD OF FABRICATING VINYLIDENE CHLORIDE POLYMERS

Ralph M. Wiley, Midland, Mich., assignor to The Dow Chemical Company, Midland, Mich., a corporation of Michigan No Drawing. Application June 1, 1942, Serial No. 445,386

5 Claims. (Cl. 18—55)

This invention relates to an improved and specific method of fabricating strong, useful articles from the polymer of vinylidene chloride and from its crystalline copolymers.

The polymer of vinylidene chloride is crystalline when examined by X-ray diffraction methods. The copolymers of vinylidene chloride with other polymerizable materials in many cases are also crystalline. It appears essential that, for such a copolymer to be crystalline, it should contain at least a preponderance of vinylidene chloride. The upper limit of the amount of copolymerizable material which may be included without destroying the crystallinity of the copolymer varies somewhat with the particular copolymerizable material employed. When too little vinylidene chloride, or conversely, too much copolymerizable compound, is present, the copolymer fails to yield a characteristic crystal pattern when examined by X-ray methods. The crystalline compositions can easily be recognized by the X-ray diffraction method, and it is the crystalline polymeric bodies to which the present invention relates.

This application is a continuation-in-part of applicant's prior application Serial No. 347,299, filed July 24, 1940. Said prior application Serial No. 347,299 was in turn a continuation-in-part of applicant's prior application Serial No. 211,055, filed May 31, 1938, now Patent 2,233,442, which patent claimed the strong, pliable articles which may be produced from crystalline vinylidene chloride polymers and copolymers by preferential orientation of the crystals or crystallites. Said prior application Serial No. 211,055 was co-pending with applicant's prior application Serial No. 162,553, filed September 4, 1937, now Patent 2,183,602, which generically claimed certain of the steps involved in the method of the present application.

Particularly strong and flexible useful articles, such as fibers, filaments, tubes, bottles, films, and cordage, are obtainable from crystalline vinylidene chloride polymer products by one specific method disclosed in said prior applications Serial No. 211,055, and Serial No. 347,299. This specific method, which constitutes the herein claimed invention, consists essentially of the following four steps, applied in the order named, to any of the crystalline polymer products wherein vinylidene chloride is the major and characterizing ingredient. The new method, then, includes heating the crystalline polymeric material to a temperature between its softening point and its decomposition temperature, and preferably at least 15 to 25 centigrade degrees above its softening point for a time sufficient to soften and melt the polymer. The molten polymer, which is thereby rendered substantially non-crystalline, is then shaped by forcing it through an orifice as by extrusion or injection molding procedures, to impart suitable and desired cross-sectional and general contour, i. e., to make films, tubes, filaments, and pre-form articles, either hollow or solid, of any desired shape. Thereafter, the shaped body is cooled or chilled, as by immersion in a cold fluid as it comes out of the extrusion die orifice or by chilling the mold in injection molding procedure, to convert the polymeric material to the supercooled condition. While the shaped body is still in the supercooled condition, i. e., before autogenous recrystallization has taken place, at least a portion of the body is stretched sufficiently, i. e. more than 100 per cent, to effect a permanent deformation thereof and to effect at least a partial recrystallization thereof. The stretching may be sufficient to take up substantially all of the cold flow of which the supercooled article is capable without rupture.

Autogenous recrystallization may occur in a few minutes or during the course of several weeks or months, depending on (a) the polymer composition, (b) the rate of chilling employed in the supercooling step, and, (c) the temperature at which the supercooled body is stored. The orientation of the crystals or crystallites in the stretched portion or over the entire body if it is stretched in its entirety, is usually parallel to the direction of the major amount of stretch. The recrystallization and orientation are readily detectable by examination of the stretched article by X-ray diffraction methods.

Articles prepared according to the above-defined method of this invention are stronger and more useful than are articles of like size and composition prepared by other of the methods disclosed in said prior application Serial No. 211,055. To illustrate, the herein claimed method produces articles superior to those made by heating the polymer, chilling to supercool it, and drawing or stretching an article such as a thread or filament from the bulk of supercooled material.

The following examples illustrate the practice of the invention:

Example 1

A copolymer of vinylidene chloride and vinyl chloride containing about 7 per cent of the latter was prepared by polymerizing a mixture of the monomers at 40° C. in the presence of 1 per cent by weight of benzoyl peroxide as a catalyst. The polymer obtained was washed with acetone, dried, and then plasticized by intimately mixing therewith 5 per cent by weight of tricresyl phosphate. The plasticized copolymer was heated to about 180° C. (approximately 25 degrees above its softening point) and extruded through an orifice having a diameter of about 0.067 inch. The extruded filament was passed directly into a water bath maintained at 25° C. to supercool the polymer. The filament was removed from the bath while still in the supercooled state and was stretched to take up a substantial proportion of the plastic flow of which it was capable without rupture. The stretched strand had a diameter of about 0.04 inch and a tensile strength of 18,000 pounds per square inch. When examined by X-ray methods, the stretched strand exhibited a characteristic X-ray diagram indicating orientation along the fiber axis. The stretched product had a softening point in the range from 150° to 160° C. and was resistant to attack by aqueous acids, alkalies, and common organic solvents. It was tough and pliable and could be tied into hard knots. Fish nets and coarse filter cloths were manufactured from filaments prepared as described above and found to be very satisfactory for their respective purpose.

*Example 2*

A vinylidene chloride-vinyl acetate copolymer, prepared by the conjoint polymerization at 45° C. of 85 parts by weight of monomeric vinylidene chloride and 15 parts of monomeric vinyl acetate, in the presence of 25 parts of trichloroethane as a liquid medium and 0.5 part of benzoyl peroxide as a catalyst, was purified and found to have a softening point of about 155° C. The copolymer was plasticized with 10 per cent of its weight of di-(alpha-phenyl-ethyl) ether. The plasticized product was extruded at 207° C. through an orifice 0.022 inch in diameter. The extruded material was cooled rapidly in air to 25° C., and stretched at room temperature substantially to the limit of which it was capable without rupture. The final diameter of the cold-stretched filament was 0.011 inch, and its tensile strength was about 57,000 pounds per square inch.

*Example 3*

A copolymer, made from 95 parts of vinylidene chloride and 5 parts of vinyl acetate in a manner analogous to that described in Example 2, and containing a plasticizer in the amount of 10 per cent, was extruded at about 200° C. through a 0.022 inch orifice, chilled rapidly in ice water and stretched at 25° C. under a tension of 1 pound applied for 10 minutes. The so-oriented strand had a tensile strength of 43,000 pounds per square inch.

To illustrate the effect of different conditions of supercooling, some of the same copolymer was extruded through the same orifice at the same 200-degree temperature. It was allowed to cool in air at 30° C. and, when the mass had reached room temperature, was stretched under an applied tension of one pound as before. In this case the oriented strand had a tensile strength of 23,000 pounds per square inch.

*Example 4*

A copolymer prepared from a mixture of 80 parts of the monomer of vinylidene chloride and 20 parts of the monomer of vinyl acetate had a softening point of 138° C. The product was plasticized by the addition of 10 per cent of its weight of a mixture of compatible, high-boiling esters and ethers. The plasticized composition was extruded through a 0.022 inch orifice at a temperature of about 190° C. The extruded strand was rapidly cooled in an air stream at 30° C. and stretched at the latter temperature approximately to the limit of which it was capable. The stretched strand had a diameter of 0.011 inch and a tensile strength of about 42,000 pounds per square inch.

*Example 5*

A vinylidene chloride-vinyl chloride polymer, prepared from a monomeric mixture of these materials containing 15 per cent of vinyl chloride, had a softening point of about 165° C. It was extruded through a 0.030 inch orifice after having been heated to about 210° C. The extruded strand was chilled by being drawn through an ice water bath and was stretched at a temperature of 18° C. to the extent of 260 per cent its original length in two seconds and then was subjected to a load of 3 pounds, the tension being maintained for 10 minutes in an atmosphere at 30° C. The final strand had a diameter of 0.014 inch and a tensile strength of 47,000 pounds per square inch.

The invention has been illustrated particularly with respect to threads, but is equally applicable to a preparation of improved articles such as tubes expanding radially at the same time they are stretched lengthwise, to extruded films which may be stretched alternately or concurrently in two or more directions, to hollow, supercooled preforms which may be expanded multi-directionally as by fluid pressure into a mold, and, to the preparation generally of articles in which it is desired to have strength, pliability, and toughness in at least a portion of the article.

The invention has been illustrated with respect to its operation on various copolymers of vinylidene chloride. It is applicable as well to other copolymers comprising this material in predominant amount provided these copolymers are of the type which exhibited crystallinity when examined by X-ray methods. In addition to the vinylidene chloride copolymers with vinyl chloride and vinyl acetate, numerous other copolymers have been produced which, in certain proportions, have the crystalline characteristics necessary to the advantageous employment of the steps of the present invention. These copolymers include that of vinylidene chloride with up to about 12 to 15 per cent of styrene, or up to about 20 per cent or more of vinyl cyanide, or up to about 15 per cent of the lower alkyl esters of acrylic or methacrylic acids, or such other polymerizable compounds as divinyl ether or chloro-allyl-chloro-acetate.

These copolymers are listed only by way of example, the invention being applicable to any and all vinylidene chloride copolymers which exhibit crystallinity when examined by X-ray diffraction methods. The invention is also applicable to the polymer of vinylidene chloride alone, more particularly when this polymer is plasticized to increase its workability. The polymer being treated may contain plasticizers, lubricants, or agents to stabilize the composition against the decompositional effects of heat and light if desired without altering the essential claimed or adversely affecting the products obtained. There may also be included in the composition subjected to treatment such other effect materials as dyes, pigments, fillers or abrasives as the particular use for the finished article may make desirable.

I claim:

1. The method of making strong flexible articles from a material selected from the group consisting of the polymer of vinylidene chloride and the crystalline copolymers thereof, which consists essentially in the steps of, (1) heating the crystalline polymeric material to a temperature between its softening point and its decomposition temperature, (2) shaping the softened polymer, (3) cooling the shaped polymeric body to convert it to a supercooled condition, and thereafter (4) stretching at least a portion of the shaped, supercooled polymer to effect a permanent deformation thereof.

2. The method which includes: melting a material selected from the group consisting of the polymer of vinylidene chloride and crystalline copolymers thereof; shaping the molten polymer; supercooling the shaped polymeric body; and stretching at least a portion of such supercooled body to effect at least a partial recrystallization thereof.

3. The method which includes: melting a material selected from the group consisting of the polymer of vinylidene chloride and crystalline copolymers thereof; shaping the molten polymer by extrusion through an orifice; supercooling the shaped polymeric body; and stretching at least a portion of such supercooled body to effect at least a partial recrystallization thereof.

4. The method which includes: melting a material selected from the group consisting of the polymer of vinylidene chloride and crystalline copolymers thereof; shaping the molten polymer by forcing it into a mold cavity; supercooling the shaped polymeric body; and stretching at least a portion of such supercooled body to effect at least a partial recrystallization thereof.

5. The method which includes: melting a material selected from the group consisting of the polymer of vinylidene chloride and crystalline copolymers thereof; shaping the molten polymer by forcing it into a mold cavity to produce a hollow pre-form; supercooling the shaped polymeric body; and stretching at least a portion of such supercooled body to effect at least a partial recrystallization thereof.

RALPH M. WILEY.